United States Patent
Shinohara et al.

(10) Patent No.: US 6,557,166 B2
(45) Date of Patent: *Apr. 29, 2003

(54) PROGRAM CORRECTING METHOD AND SYSTEM

(75) Inventors: Makiko Shinohara, Hadano (JP); Hideaki Amano, Hadano (JP)

(73) Assignee: Hitachi, Ltd., Tokyo (JP)

( * ) Notice: Subject to any disclaimer, the term of this patent is extended or adjusted under 35 U.S.C. 154(b) by 49 days.

This patent is subject to a terminal disclaimer.

(21) Appl. No.: 09/750,039

(22) Filed: Dec. 29, 2000

(65) Prior Publication Data

US 2001/0000825 A1 May 3, 2001

Related U.S. Application Data

(63) Continuation of application No. 08/611,760, filed on Mar. 8, 1996, now Pat. No. 6,205,577.

(30) Foreign Application Priority Data

Mar. 16, 1995 (JP) ............................................. 7-084658

(51) Int. Cl.⁷ .............................................. G06F 13/00
(52) U.S. Cl. ...................................................... 717/124
(58) Field of Search ................................ 709/200, 213, 709/214, 216; 717/100, 101, 124, 125, 126

(56) References Cited

U.S. PATENT DOCUMENTS

| | | | |
|---|---|---|---|
| 5,065,400 A | 11/1991 | Masuishi | 395/703 |
| 5,289,588 A | 2/1994 | Song et al. | 711/120 |
| 5,446,900 A | 8/1995 | Kimelman | 395/705 |
| 5,491,821 A | 2/1996 | Killis | 395/705 |
| 5,586,328 A | 12/1996 | Caron et al. | 395/705 |

FOREIGN PATENT DOCUMENTS

JP  397030  4/1991

*Primary Examiner*—Robert B. Harrell
(74) *Attorney, Agent, or Firm*—Antonelli, Terry, Stout & Kraus, LLP

(57) ABSTRACT

Correction of a program which resides on a main storage and which is simultaneously callable by a plurality of command processors is performed by minimizing the stop time of a computer system without reloading a program. A particular command processor calls a correction execution program which corrects a program in accordance with a program correction command. The correction execution program reads program correction information, sets correction execution declaration information in all entries of other command processor in the correction execution declaration area of the main storage and after clearing all entries, the correction execution program corrects the program in accordance with the program correction information. The correction execution program sets correction completion reporting information in all entries for all of the other command processors in the correction completion reporting area of the main storage. The correction execution program waits for the correction completion reporting area to be cleared, at which time it sends the corrected program to the external storage. The program to be corrected calls a correction wait program, which recognizes the command processor which has called the correction wait program itself, checks an entry of the appropriate command processor in the correction execution declaration area. When the correction execution declaration information has been set, the correction wait program clears the correction execution declaration information, repeatedly checks the entry of the appropriate command processor in the correction completion reporting area, and when the correction completion reporting information has been set, clears same to thereby terminate the processing.

8 Claims, 3 Drawing Sheets

PROGRAM CORRECTING METHOD AND SYSTEM

RELATED APPLICATIONS

This is a continuation of application Ser. No. 08/611,760, filed Mar. 8, 1996, now U.S. Pat. No. 6,205,577.

BACKGROUND OF THE INVENTION

The present invention relates to methods of correcting a program in a computer system, and more particularly to a method of correcting a program which resides always on a main storage of a computer system which is difficult to stop.

As a method of correcting a program in a computer system, there is a method of rewriting a program in its entirety in the computer system by reloading a corrected program. A method of correcting a program in a computer system without reloading such a program is disclosed in JP-A-3-97030 entitled "PROGRAM CORRECTING SYSTEM" in which a correcting program provided beforehand in the computer system is replaced with a program to be corrected.

SUMMARY OF THE INVENTION

Correction to a program having a reentrant structure constructed such that two or more tasks can be used simultaneously, which is an object of the present invention, by reloading a corrected program has been found impractical because it requires much labor for initialization in the reloading of the corrected program. The method of correcting a program by replacing a correcting program provided beforehand in the computer system with a program to be corrected has the following problems. For a program having a reentrant structure such as that of the present invention, it has been found that there is a danger that a program may run by another command processor in the course of its correction, which should be avoided. It has also been found desirable even in such a case to minimize the time in which the running of the program has been avoided to thereby minimize the influence on the availability factor of the system.

It is therefore an object of the present invention to provide a program correcting method and system which corrects a program which resides always in a main storage which a plurality of command processors can call simultaneously without reloading a corrected program and running a program in the course of correction and minimizes the stop time of the system due to avoidance of such running of the program.

In order to achieve this object, the present invention provides a method of correcting a program in a computer system which includes in combination a plurality of command processors, a main storage, a command unit for commanding correction to a program and an external storage which information to correct the program is stored, the program being callable by a plurality of the command processors. In this method, program correction information including at least a correction place and content of a program is fetched in accordance with a command for correction to the program. A command processor which executes correction to the program is designated from among the plurality of command processors. Correction execution declaration information is set in all subareas of the correction execution declaration area for the plurality of command processors other than its subarea for the designated command processor IPm in accordance with a command from the designated command processor IPm. The respective command processors other than the designated one IPm determine whether correction execution declaration information is been set in corresponding subareas of the correction execution declaration area for the respective command processors in accordance with an instruction from a program, to be corrected, which the respective command processors have called. If so, they clear the correction execution declaration information. In addition, they determine whether correction completion reporting information has been set in the corresponding subareas of the correction completion reporting area of the main storage, and iterate this determination until the corresponding completion reporting information is set. Thereafter, subsequently, they determine repeatedly whether all the correction execution declaration information in the subareas of the correction execution declaration area other than that for the IPm has been cleared. If so, they execute correction to the program, to be corrected,in accordance with the correction information. When the correction to the program ends, they set correction completion reporting information in all the subareas of the correction execution declaration area of the main storage except for the subarea for its designated command processor to thereby correct the program.

According to such method, after correction execution declaration information has been set in correction execution declaration areas of command processors other than a command processor IPm, each IP other than the IPm clears the corresponding correction execution declaration information. After all the correction execution declaration have been cleared, the program is then corrected on the basis of the program correction information. Correction completion report information is set in each of the correction completion reporting areas of the command processors other than the IPm. The respective command processors other than IPm repeatedly check whether the correction completion reporting information has been set in the corresponding correction completion reporting area and clears it, if any. When the correction completion reporting information in all the correction completion reporting areas has been cleared, the corrected program is sent to the external storage and stored therein, and the respective command processors other than the IPm repeatedly check the setting of the correction completion reporting information in the corresponding correction completion reporting areas, thus, the running of the program by the respective command processors is avoided.

DESCRIPTION OF THE PREFERRED EMBODIMENT

Figure 1:
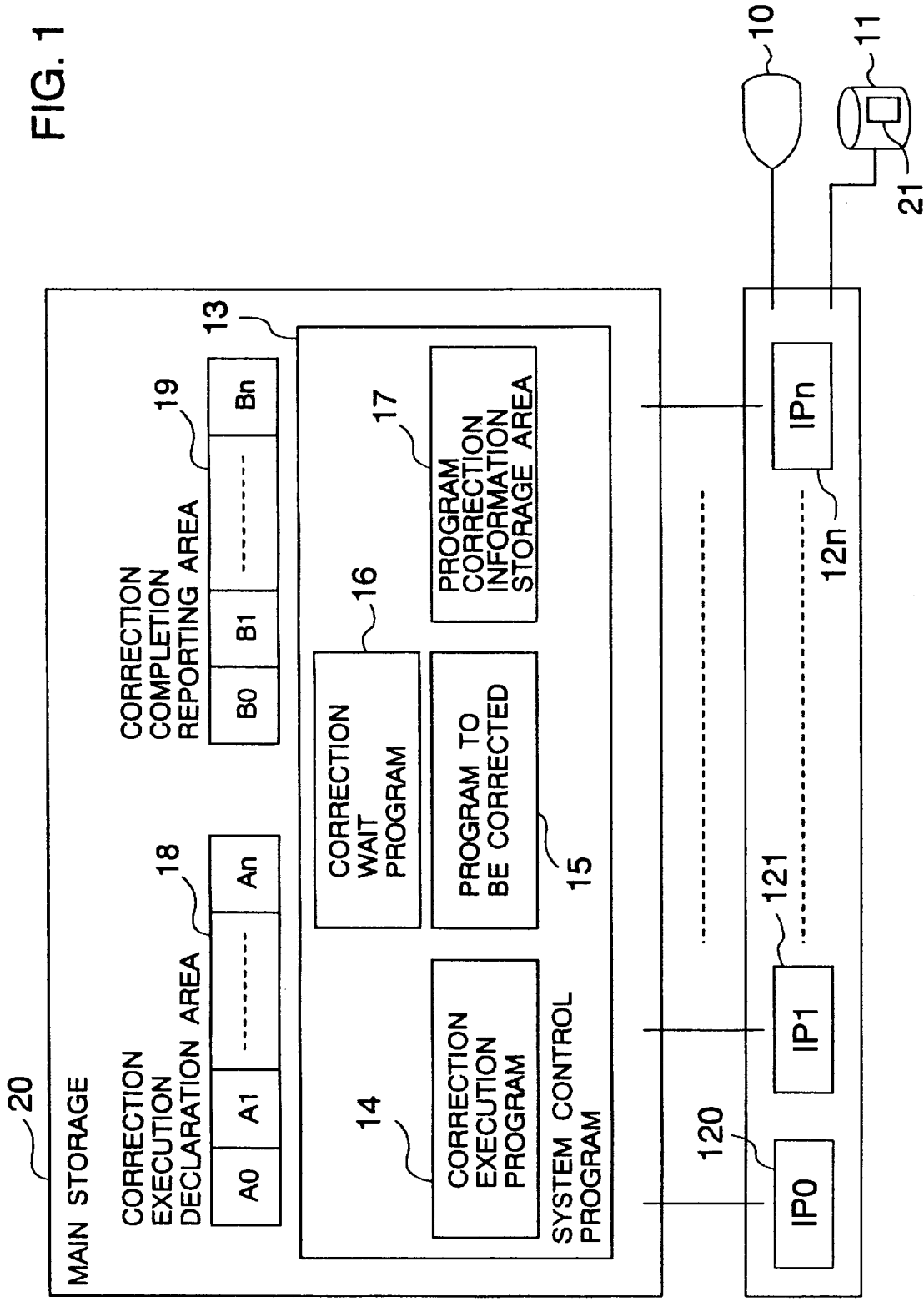
FIG. 1 is a block diagram indicative of the essential portion of a computer system as one embodiment of the present invention.

One embodiment of a computer system according to the present invention will be described below with reference to the accompanying drawings. FIG. 1 is a block diagram indicative of the essential portion of a computer system as one embodiment of the present invention In FIG. 1, reference numeral 10 denotes a user console through which the operator inputs a correction command for a program; 11, an external storage which stores correction information 21 which contains addresses of a portion of the program to be corrected and information on the content of the program to be corrected; 120, 121, . . . , 12n, corresponding command processors IP0, IP1, . . . , IPn which are connected to a main storage 20, which contains a system control program 13, which in turn, includes a correction execution program 14 executed when the system receives a command for program correction, a program 15 to be corrected, and a correction wait program 16 which is called by the program 15. The system control program 13 has a storage area 17 for program correction information 21 received from the external storage 11. The main storage 20 has a correction execution declaration area 18 and a correction completion reporting area 19. Reference characters A0, A1, . . . , An denote correction execution declaration area entries. Reference characters B0, B1, . . . , Bn denote entries in the correction completion reporting area corresponding to the respective command processors IP0, IP1, . . . , IPn.

Actual correction to a program will be described next. When the system control program 13 of the main storage 20 receives a request for program correction by the operator through the user console 10, it designates one (IPm in the present embodiment) of the plurality of command processors IP connected to the main storage 20 and commands the IPm to call the correction execution program. Upon receiving the command, the command processor IPm executes the correction execution program 14 of the main storage 20.

Figure 2:
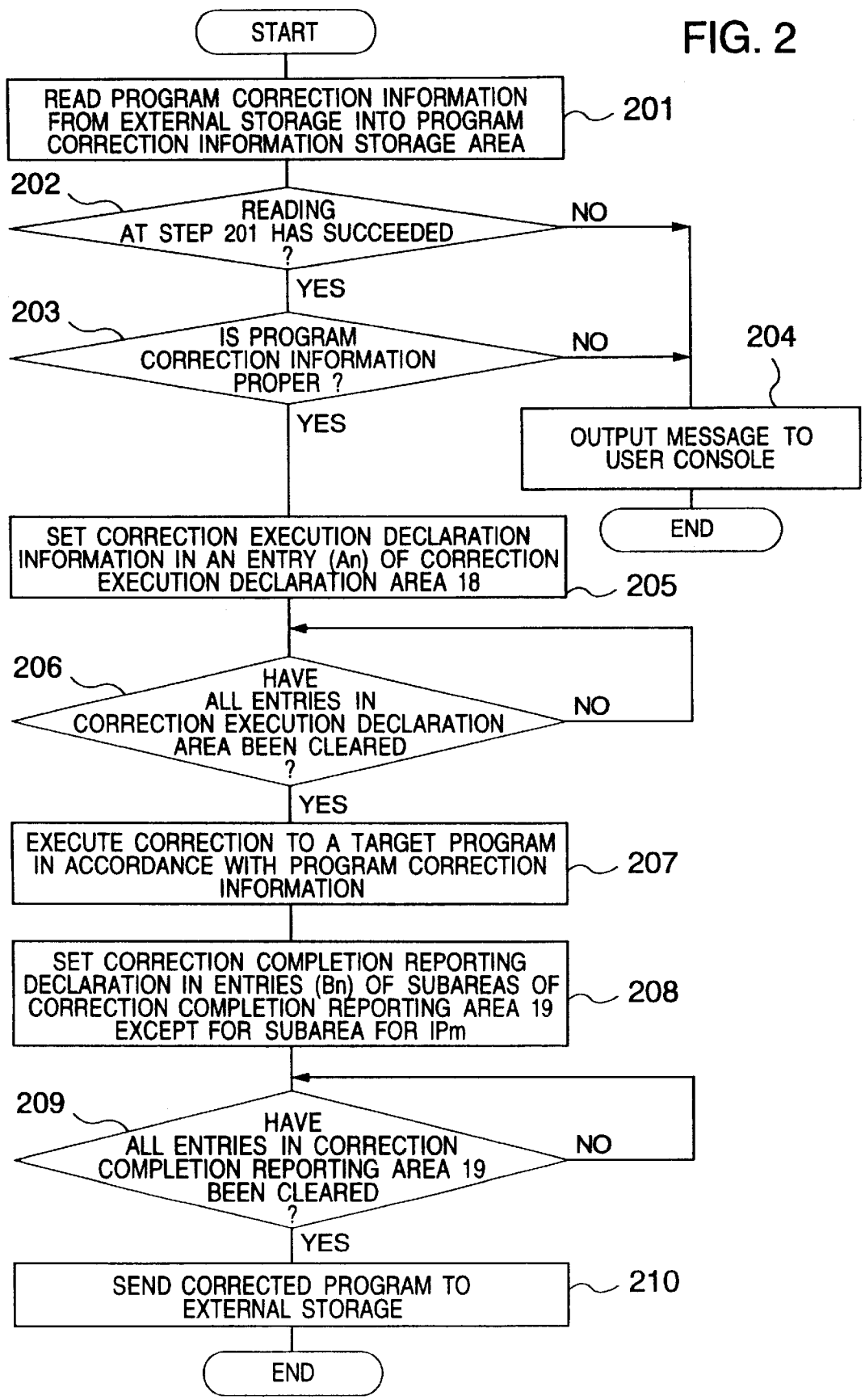
FIG. 2 is a flow chart indicative of processing by a correction execution program called by a command processor IPm.
Figure 3:
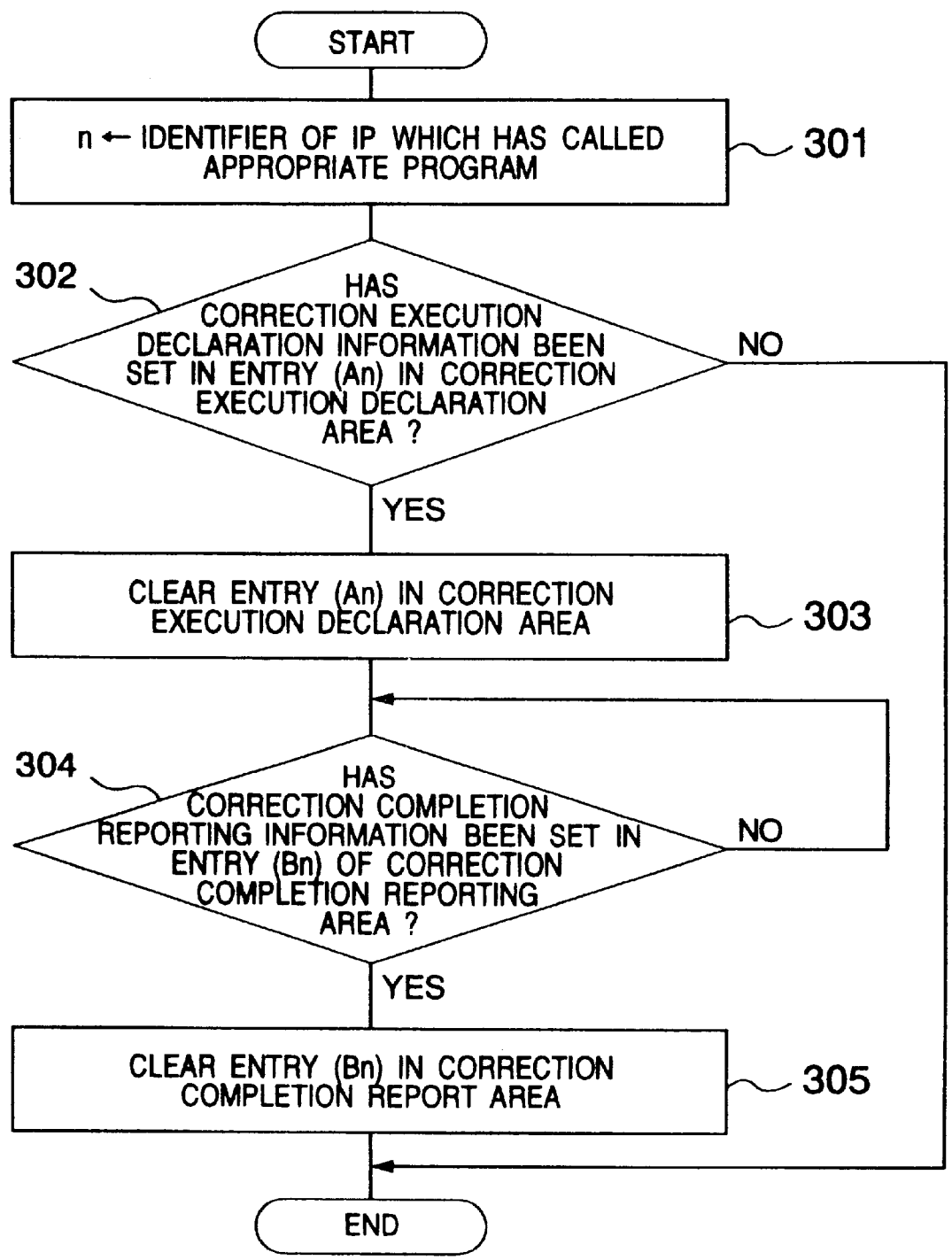
FIG. 3 is a flow chart indicative of the processing of a correction wait program 16 called by a program 15 to be corrected, when the program correction is executed.

FIG. 2 is a flow chart indicative of processing by a correction execution program called by a command processor IPm. FIG. 3 is a flow chart indicative of the processing of a correction wait program 16 called by a program 15 to be corrected, when the program correction is executed. Referring to FIGS. 2 and 3, when the correction execution program 14 receives a startup command by the command processor IPm at step 205, it transfers program correction information 21 from the external storage 11 to the program correction information storage area 17 of the system control program 13 (step 201). The correction execution program 14 determines at step 202 whether the transfer at step 201 has succeeded. If there is no program correction information 21 in the external storage 11 or the program correction information 21 cannot be transferred due to some failure of the external storage 11, it informs the user console 10 of this fact (step 204) and terminates the processing. When the transfer has succeeded, the IPm checks whether the program correction information 21 is proper by comparing program correction information 21 in which an uncorrected program and a program to be corrected are contained with the program 15 to be corrected (step 203). When the propriety of the program correction information 21 can not be confirmed, the correction execution program 14 displays a message to that effect on the console 10 and reports it to the operator (step 204) to thereby terminate the processing.

When the propriety of the program correction information 21 is confirmed, correction execution declaration information is set in the respective entries An (n≠m) corresponding to the command processors other than IPm in the correction execution declaration area 18 of the main storage 20 (step 205).

After the correction execution program 14 has set the correction execution declaration information in all the entries corresponding to the command processors other than IPm in the correction execution declaration area 18 checks whether the correction execution declaration information set in the respective entries An (n≠m) of the correction execution declaration area 18 is processed by a correction wait program 16 to be described later (step 303) and hence whether the entries corresponding to all the command processors other than IPm have been cleared (step 206). This processing is repeated until all the entries in the correction execution declaration information 18 are cleared.

After the correction execution program 14 has confirmed that all the entries in the correction execution declaration area 18 have been cleared, it corrects the program 15, to be corrected, in accordance with the program correction information 21 stored in the program correction information storage area 17 (step 207).

When the correction is completed, correction completion reporting information is set in the respective entries Bn (n≠m) corresponding to all the command processors other than IPm in the correction completion reporting area 19 (step 208).

The correction execution program 14 further checks whether the correction completion reporting information set in the respective entries Bn (n≠m) in the correction completion reporting area 19 corresponding to all the command processors other than IPm has been all cleared (step 214) by the processing of the correction wait program (step 305). This processing is iterated until all the entries are cleared.

After the correction execution program 14 has confirmed that all the entries corresponding to the command processors other than the IPm for the correction completion reporting information in the correction completion reporting area 19 have been cleared, the correction execution program 14 sends the corrected program to the external storage 11 (step 210) to thereby terminate the processing of the correction execution program.

The external storage 11 which has received the corrected program sent in accordance with a command from the correction execution program 14 stores the corrected program in the external storage.

The command processor IPn (n≠m) other than IPm which has started up the correction execution program 14 has called the program 15 to be corrected, and starts up the correction wait program 16 shown by a flow chart of FIG. 3 at given intervals or during interruption of the processing with the aid of a timer (not shown).

A process performed by the correction wait program 16 called by the program 15, to be corrected, in the course of the execution of the program 15 will be described with reference to FIG. 3.

The correction wait program 16 determines (step 301) which command processor has issued a startup command which starts up the correction wait program 16, checks the entry An of the correction execution declaration of that command processor in the correction execution declaration area 18 of the main storage 20 (step 302) to recognize that the correction execution declaration information of that command processor has been set, at which time the correction wait program 16 clears that entry An (step 303). When there is no correction execution declaration information in the correction execution declaration area 18 at step 207, it terminates the processing of the started-up correction wait program 16.

Subsequently, the correction wait program 16 checks whether the correction completion reporting information has been set in the correction completion reporting area 19 of the main storage 20 (step 304). If so, the correction wait program 16 clears that entry Bn (step 305) and terminates the processing thereof. When there is no correction completion reporting information set in the correction completion reporting area 19, the correction wait program 16 monitors the correction completion reporting area 19 to thereby iterate its checking until the correction completion reporting information is set. When such processing ends, the respective command processors perform regular program processing.

Changing and checking the correction execution declaration area 18 and the correction completion reporting area 19 are performed, using an interlock update technique which includes exclusive control.

As described above, according to the present invention, correction to a program which resides always on the main storage and which can be called simultaneously by a plurality of command processors can be performed on the main storage without reloading a corrected program. Thus, the time when the stop time of the system is reduced.

In addition, by limiting the time when the running of the program is avoided to the period in which the program is in the course of correction, the influence of program correction on the availability factor of the system is minimized.

What is claimed is:

1. A computer program on a storage medium for correcting a program stored in a main storage, access to which is shared by a plurality of command processors which can call said program simultaneously, said computer program when executed causes a computer to perform the steps of:

ensuring a first area and a second area, each having subareas corresponding to the respective command processors in said main storage;

designating a command processor which executes program correction from among a plurality of command processors;

fetching, by a first program, program correction information including at least a correction place and contents of a second program;

setting, by said first program, a flag in each of said subareas of said first area other than a subarea corresponding to the designated command processor in accordance with a command from the designated command processor;

calling a third program from said second program which is run by one of said plurality of command processors other than the designated processor;

causing, by said third program, the respective command processors other than the designated command processor to determine whether flags have been set in subareas of said first area corresponding to the respective command processors other than the designated command processor;

clearing, by said third program, the flags, if set, in each of said subareas of said first area corresponding to the respective command processors other than the designated command processor;

determining whether the flags have been cleared in the subareas of said first area corresponding to the respective command processors other than the designated command processor;

correcting the program to be corrected in accordance with the correction information in said first program when the flags in all of said subareas of said first area other than the subarea for the designated command processor are determined to have been cleared; and setting flags, by said first program, in all of said subareas of said second area other than the subarea corresponding to the designated command processor when the correction to the program to be corrected has been completed.

2. A computer program according to claim 1, wherein said computer program when executed causes the respective command processors other than the designated command processor to perform the steps of:

determining, by said third program, whether flags have been set in said subareas of said second area corresponding to the respective command processors other than the designated command processor;

clearing the flags, if set, in said subareas of said second area corresponding to the command processors other than the designated processor, respectively, by said third program;

determining whether all of said subareas of said second area for the command processors other than the designated command processor have been cleared, and repeating said determining step until all of said subareas other than said subarea for the designated command processor are cleared by said first program; and sending a corrected program when all of said subareas of said second area corresponding to the command processors other than the designated command processor have been cleared.

3. A computer program according to claim 2, wherein said computer program when executed causes a computer to perform the step of:

connecting an external storage to said main storage to save the corrected program sent to said external storage.

4. A computer program according to claim 1, wherein said computer program when executed further causes a computer to perform the steps of:

determining, after fetching said program correction information describing at least the correction place and content of correction to said program, whether said program correction information is proper to continue the correction to the program; and terminating the correction if said program correction information is not proper.

5. A computer program according to claim 4, wherein the propriety of the program correction information is determined by comparing the program to be corrected and an uncorrected program contained in the correction information.

6. A computer program according to claim 1, wherein when the respective command processors other than the designated command processor determine that the flags have not been set in the corresponding subareas of said first area in accordance with a command of the called third program, the processing of the respective command processors is terminated.

7. A computer program according to claim 1, wherein said step of fetching the program correction information is performed in response to a program correction command.

8. A computer program on a storage medium for correcting a program stored in a main storage, access to which is shared by a plurality of command processors, wherein said command processors can call said program from said main storage simultaneously, and said main storage includes a first area having subareas corresponding to said command processors, said computer program when executed causes a computer to perform the steps of:

fetching, by a first program, program correction information including at least a correction place and content of a second program;

designating, by said first program, a command processor which executes a program correction from among said command processors and setting flags in all of said subareas in said first area corresponding to command processors other than the designated command processor in accordance with a command from the designated command processor;

calling a third program by said second program, said third program being run by one of said plurality of command processors other than the designated command processor;

determining, by said third program, whether flags have been cleared in the subareas of said first area corresponding to the command processors other than the designated command processor; and correcting said second program in accordance with the correction information in said first program when the flags in all of the subareas in said first area other than the subarea corresponding to the designated command processor have been cleared.

* * * * *